(12) United States Patent
Lundborg

(10) Patent No.: US 6,658,262 B1
(45) Date of Patent: Dec. 2, 2003

(54) METHOD AND SYSTEM FOR POWER CONTROL ORDER MESSAGE MANAGEMENT

(75) Inventor: Tomas Lundborg, Stockholm (SE)

(73) Assignee: Telefonaktiebolget LM Ericsson (publ), Stockholm (SE)

(*) Notice: Subject to any disclaimer, the term of this patent is extended or adjusted under 35 U.S.C. 154(b) by 0 days.

(21) Appl. No.: 09/472,288

(22) Filed: Dec. 27, 1999

(51) Int. Cl.[7] .................................................. H04B 7/00
(52) U.S. Cl. ......................................... 455/522; 455/69
(58) Field of Search .......................... 455/69, 522, 442, 455/517, 436, 452, 70

(56) References Cited

U.S. PATENT DOCUMENTS

| | | | |
|---|---|---|---|
| 5,751,763 A | 5/1998 | Bruckert | |
| 5,918,176 A | 6/1999 | Arrington, Jr. et al. | |
| 6,002,942 A | * 12/1999 | Park | ............................ 455/522 |
| 6,408,165 B1 | * 6/2002 | Raissinia et al. | ........... 455/522 |
| 6,463,295 B1 | * 10/2002 | Yun | ............................ 455/522 |
| 2001/0017848 A1 | * 8/2001 | Tiedemann | .................. 370/318 |

FOREIGN PATENT DOCUMENTS

| | | |
|---|---|---|
| WO | WO98/36508 | 8/1998 |
| WO | WO98/58461 | 12/1998 |

* cited by examiner

*Primary Examiner*—Nay Maung
*Assistant Examiner*—Tu X Nguyen

(57) ABSTRACT

Methods and systems for transmitting power control commands in radiocommunication systems are described. To reduce the usage of fast associated control channel "blank-and-burst" techniques, the present invention provides mechanisms for reducing the frequency of transmission of uplink power control commands to mobile stations. More specifically, the frequency of transmission of uplink power control commands by the system can be reduced when the transmit power level of the mobile station is already relatively low and when the uplink power control commands seek to further reduce the transmit power level of the mobile station.

27 Claims, 6 Drawing Sheets

| MOBILE STATION POWER LEVEL (PL) | MOBILE ATTENUATION CODE (MAC) | NOMINAL ERP (dBW) FOR MOBILE STATION POWER CLASS | | | | | | | |
|---|---|---|---|---|---|---|---|---|---|
| | | I | II | III | IV | V | VI | VII | VIII |
| 0 | 0000 | 6 | 2 | -2 | -2 | . | . | . | . |
| 1 | 0001 | 2 | 2 | -2 | -2 | . | . | . | . |
| 2 | 0010 | -2 | -2 | -2 | -2 | . | . | . | . |
| 3 | 0011 | -6 | -6 | -6 | -6 | . | . | . | . |
| 4 | 0100 | -10 | -10 | -10 | -10 | . | . | . | . |
| 5 | 0101 | -14 | -14 | -14 | -14 | . | . | . | . |
| 6 | 0110 | -18 | -18 | -18 | -18 | . | . | . | . |
| 7 | 0111 | -22 | -22 | -22 | -22 | . | . | . | . |
| DUAL-MODE ONLY | | | | | | | | | |
| 8 | 1000 | -22 | -22 | -22 | -26±3 dB | . | . | . | . |
| 9 | 1001 | -22 | -22 | -22 | -30±6 dB | . | . | . | . |
| 10 | 1010 | -22 | -22 | -22 | -34±9 dB | . | . | . | . |
Fig. 1
(PRIOR ART)
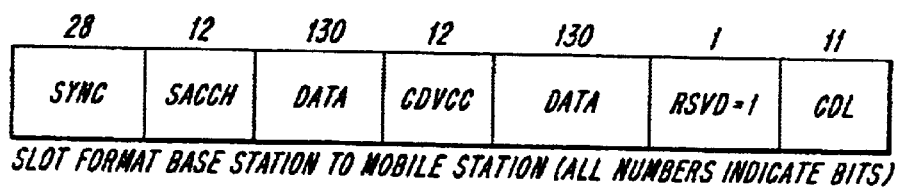
SLOT FORMAT BASE STATION TO MOBILE STATION (ALL NUMBERS INDICATE BITS)
Fig. 2(a)
(PRIOR ART)
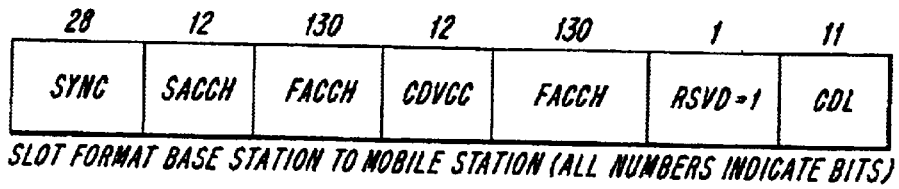
SLOT FORMAT BASE STATION TO MOBILE STATION (ALL NUMBERS INDICATE BITS)
Fig. 2(b)
(PRIOR ART)

METHOD AND SYSTEM FOR POWER CONTROL ORDER MESSAGE MANAGEMENT

BACKGROUND

The present invention relates to a method and system for selectively transmitting power change commands used for uplink power control in wireless telecommunication systems.

Traditionally, radio communication systems have employed either Frequency Division Multiple Access (FDMA) or Time Division Multiple Access (TDMA) to allocate access to available radio spectrum. Both methods attempt to ensure that no two potentially interfering signals occupy the same frequency at the same time. For example, FDMA assigns different signals to different frequencies. TDMA assigns different signals to different timeslots on the same frequencies. TDMA methods reduce adjacent channel interference through the use of synchronization circuitry which gates the reception of information to prescribed time intervals.

In contrast, Code Division Multiple Access (CDMA) systems allow interfering signals to share the same frequency at the same time. More specifically, CDMA systems "spread" signals across a common communication channel by multiplying each signal with a unique spreading code sequence. The signals are then scrambled and transmitted on the common channel in overlapping fashion as a composite signal. Each mobile receiver correlates the composite signal with a respective unique despreading code sequence, and thereby extracts the signal addressed to it.

Transmit power control methods can be important to communication systems having many simultaneous transmitters because such methods reduce the mutual interference of such transmitters. For example, transmit power control is necessary to obtain high system capacity in CDMA and is likewise useful for TDMA. Power control techniques are important for the uplink, i.e., for transmissions from a remote terminal to the network, e.g., a base station, as well as for the downlink, i.e., for transmissions from the base stations to a remote station. Uplinks and downlinks are also sometimes referred to as reverse links and forward links, respectively.

The need for transmit power control in the uplink is recognized, for example, in current CDMA cellular systems. Uplink power control according to the TIA/EIA/IS-95-A standard is provided by a closed-loop method, in which a base station measures the strength of a signal received from a remote station and then transmits one power control bit to the remote station every 1.25 milliseconds. Based on the power control bit, the remote station increases or decreases its transmit (uplink) power by a predetermined amount.

Similar techniques are applied in TDMA cellular systems. For example, systems which operate in compliance with ANSI-136 provide for a number of different power levels at which remote stations (e.g., mobile stations) can transmit as illustrated in FIG. 1. Therein, ten different power levels are defined for each of four different classes of mobile stations. The different classes of mobile stations refer to different maximum burst power levels, e.g., Class IV mobile stations have a maximum burst power level of 0.6 Watts (on average). More importantly, according to ANSI-136, the mobile stations shall be able to set their respective output transmit power level to the level specified in a control message using the mobile attenuation codes shown in FIG. 1.

In ANSI-136 systems, quality measurements are made periodically, e.g., every second, to determine an appropriate uplink transmit power for a particular mobile station. If the determined uplink transmit power is different from the uplink transmit power currently employed by that mobile station, then a power change command is transmitted to that mobile station. More specifically, the uplink power change command is transmitted to the mobile station using the downlink fast associated control channel (FACCH). Unlike the slow associated control channel (SACCH), the FACCH is implemented in a "blank-and-burst" manner, which means that when control information is to be transmitted to the mobile station on the FACCH, this control information replaces the payload data (e.g., voice information) which would have otherwise been transmitted.

This difference between transmitting control information using the SACCH and transmitting control information on the FACCH will be better understood by reference to FIGS. 2(a) and 2(b). FIG. 2(a) depicts a downlink timeslot format for a burst of information which has not been "blanked out" by a FACCH transmission. Note that each downlink timeslot includes a 12 bit field for the SACCH, which can be used to convey less critical overhead information, e.g., short text messages. The payload data, e.g., vocie information, is conveyed in the two DATA fields. By way of contrast, FIG. 2(b) depicts a downlink timeslot format for a burst of information wherein FACCH information, e.g., a power change command, has replaced the payload data fields. Since the payload data fields comprise 260 bits in each burst, the FACCH provides a mechanism for more quickly sending control information to a mobile station as compared with the SACCH.

However, using the FACCH to transmit power change information has a price, specifically that the payload data which would otherwise have been transmitted is discarded in favor of the power change information. This, in turn, creates problems at the receive side in the mobile station, e.g., by reducing the quality of the reproduced voice signal as perceived by the mobiles station's user.

Accordingly, it would be desirable to design systems and methods which provide power control mechanisms in such radiocommunication systems that minimize the loss of payload data due to the transmission of power change commands, while continuing to provide the benefits of power control, e.g., controlling the amount of interference generated by uplink transmissions.

SUMMARY

These and other drawbacks, limitations and problems associated with conventional power control messaging methods and systems are overcome by exemplary embodiments of the present invention. More specifically, the Applicant has recognized that (1) approximately 80% of the system carrier-to-interference (C/I) gain associated with uplink power control has already been achieved with respect to a particular mobile station when that mobile station output transmit power is about 8 dB less than its maximum output transmit power (e.g., from power level 1 to power level 4 in the example of FIG. 1) and (2) that about 20% of the power change commands transmitted by the system for uplink power control involve power levels below this threshold.

Thus, exemplary embodiments of the present invention reduce the frequency of transmission of uplink power change commands by the system for power level commands which instruct a remote station to transmit at one of the lower power levels. This, in turn, increases the speech quality associated with the payload data received by that remote station, since the payload data is "blanked" out less frequently by the power change commands.

For example, according to one exemplary embodiment of the present invention, a method for transmitting a power change command to a remote station in a radiocommunication system includes the steps of: determining, in the radiocommunication system, one of a plurality of power levels at which the remote station shall transmit, selecting a time at which to transmit the power change command to the remote station, wherein the selected time is based upon the one of the plurality of power levels, and transmitting, by the radiocommunication system, the power change command at the selected time.

Even more generally, systems and methods according to the present invention can determine the frequency at which uplink power change commands are transmitted by the system as a function of the power level being conveyed in the power change commands. For example, a method for transmitting a power change command to a remote station in a radiocommunication system can include the steps of: determining, in the radiocommunication system, one of a plurality of power levels at which the remote station shall transmit, and transmitting, by the radiocommunication system, the power change command to the remote station with a frequency that is based upon the determined one of the plurality of power levels.

BRIEF DESCRIPTION OF THE DRAWINGS

The foregoing, and other, objects, features and advantages of the present invention will be more readily understood upon reading the following detailed description in conjunction with the drawings in which:

FIG. 1 is a table depicting a conventional relationship between uplink power change codes and output transmit power levels of a mobile station in an exemplary radiocommunication system;

FIG. 2A illustrates a conventional downlink slot format;

FIG. 2B illustrates the conventional downlink slot format of FIG. 2A wherein the payload data fields have been replaced by control (FACCH) data;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 3:
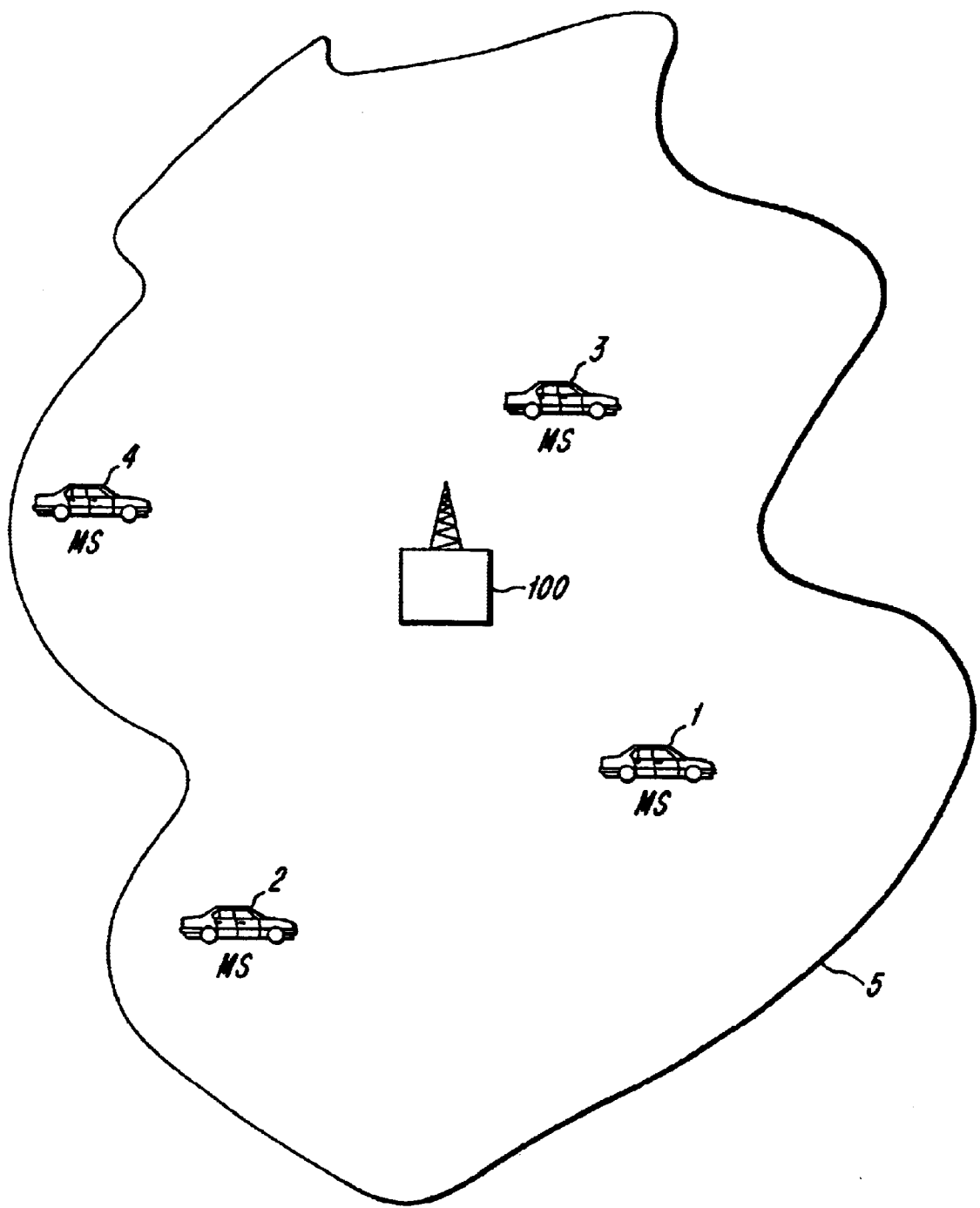
FIG. 3 depicts a plurality of mobile stations connected to a base station in an exemplary radiocommunication system.

Consider the exemplary situation depicted in FIG. 3. Therein, a base station 100 is currently handling connections with four mobile stations, MS1–MS4. For the purposes of this exemplary embodiment, consider that the system depicted in FIG. 3 operates using a TDMA access methodology with duplexed downlink (i.e. base-to-mobile direction) and uplink (i.e. mobile-to-base direction) channels. In the downlink, base station 100 transmits to each of mobile stations MS1–MS4 using a certain power level associated with each of these mobile stations. In the uplink, mobile stations MS1–MS4 communicate with the base station 100, each using a certain power level. For example, MS3 would likely transmit at a lower power level than MS2 since it is closer to base station 100. Although not shown, the base station 100 is in communication with a radio network controller (RNC), which in turn is connected to a public switched telephone network (PSTN).

Figure 4:
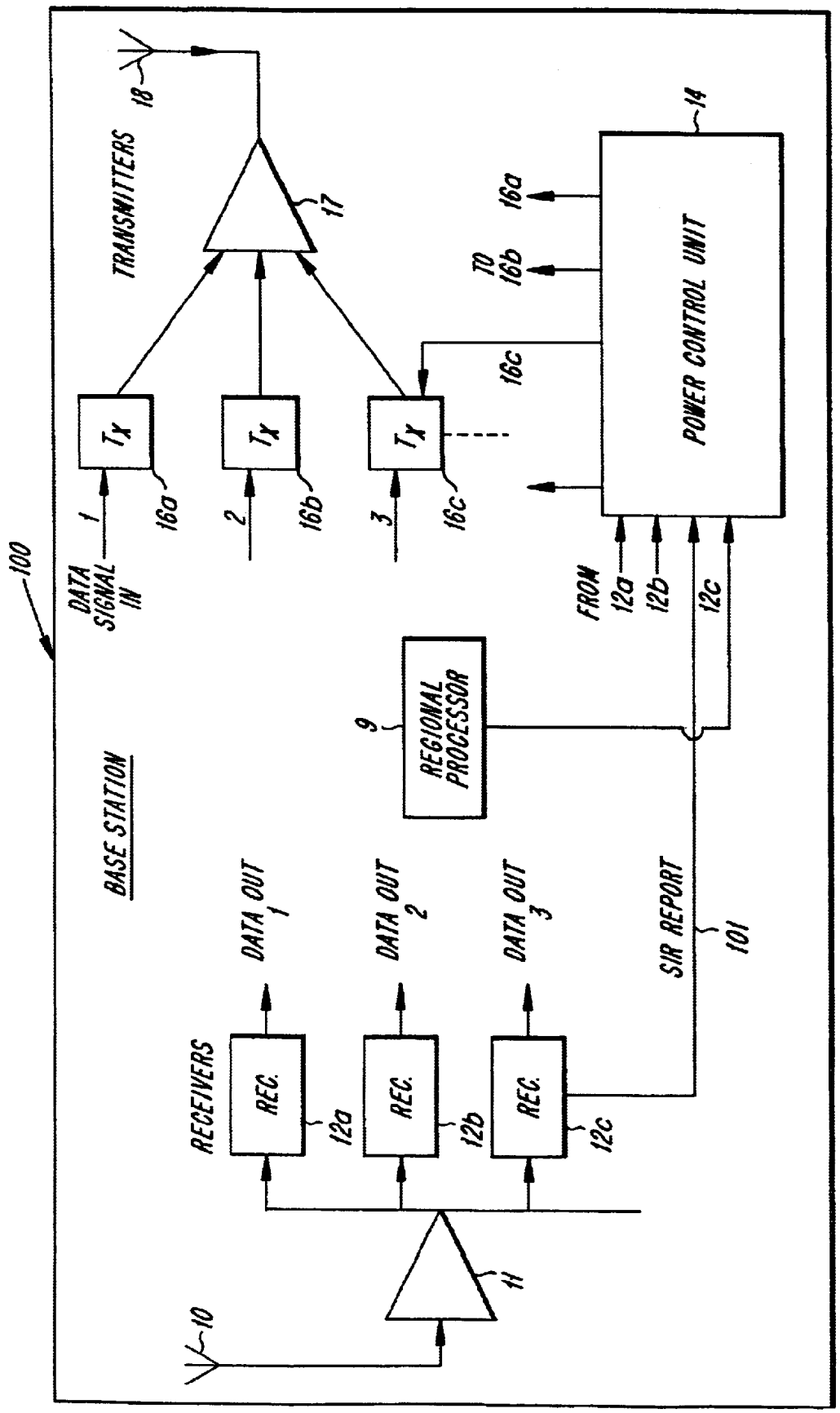
FIG. 4 is a block diagram of a base station according to an exemplary embodiment of the present invention.

As illustrated in FIG. 4, the base station 100 is equipped with a plurality of transmitters 16 (only three transmitters 16a, 16b, 16c are illustrated to simplify the figure) for transmitting different data signals to a plurality of mobile stations via a transmitter amplifier 17 and an antenna 18. The relative power level of each transmitted signal is determined by a power control unit 14. The power control unit receives quality measurement information associated with the mobile stations' transmissions on the uplink, e.g., signal-to-interference (SIR) information via input 101, and uses a power control algorithm to determine how to control the downlink power of its own transmissions, as well as to determine the power change command (if a power change is indicated) which should be sent to each mobile station to control the uplink power of each mobile station's transmissions. Any known power control algorithm may be employed to determine an appropriate uplink transmit power for each mobile station, which power control algorithms will be known to those skilled in the art. The transmission of power change commands which identify the determined uplink power level(s) to the mobile stations MS1–MS4 according to exemplary embodiments of the present invention is described in more detail below. A regional processor 9 controls the overall operation of the base station 100.

Figure 5:
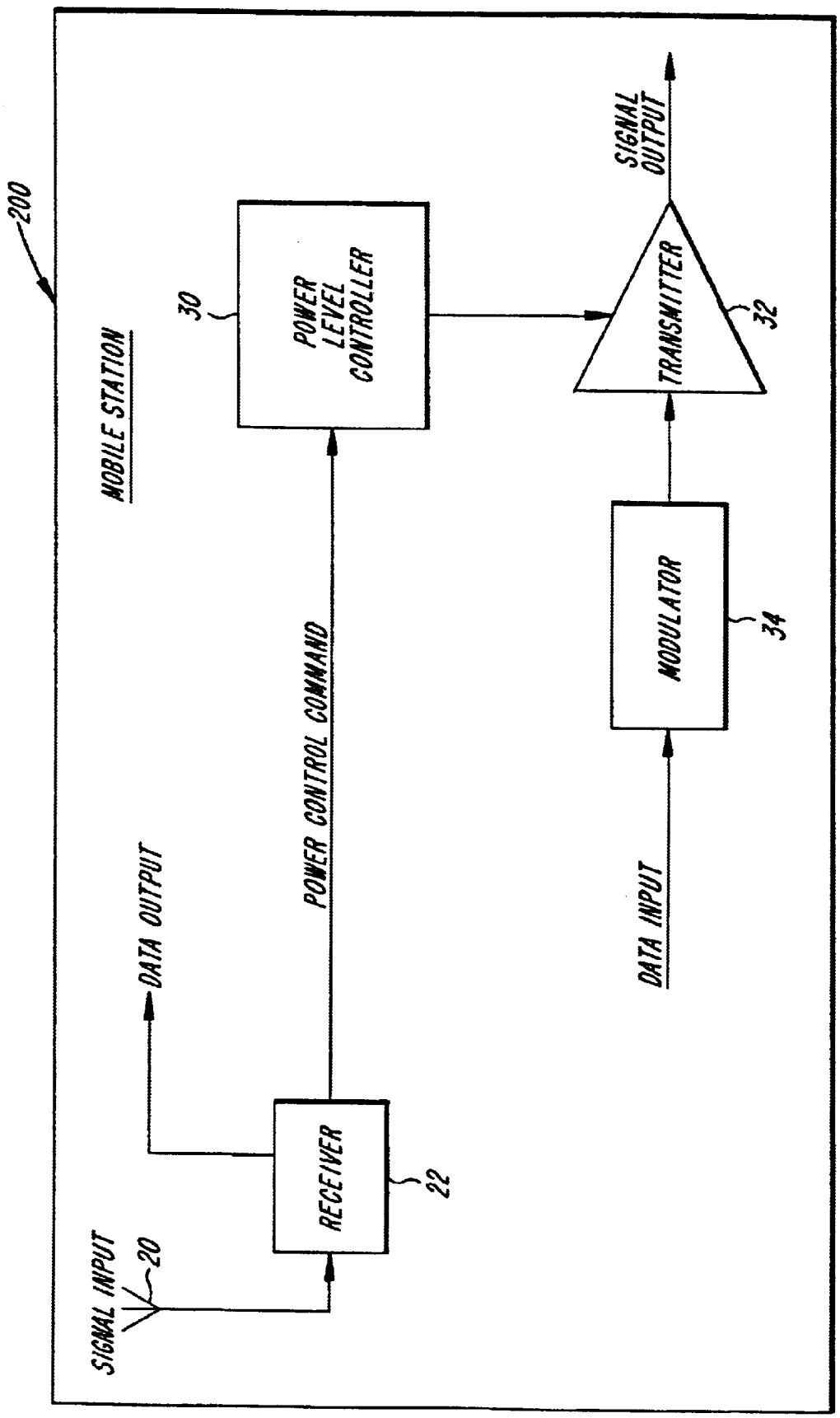
FIG. 5 is a block diagram of a mobile station according to an exemplary embodiment of the present invention.

According to FIG. 5, an exemplary mobile station 200 (e.g., any one of MS1–MS4) is equipped with a receiver 22 which operates in a conventional manner to filter, amplify and demodulate a signal from antenna 20. Data signals demodulated in the receiver 22 are generated as output data signals for subsequent use, e.g., output to a speaker so that a user can hear the transmitted voice signals. Additionally, the receiver 22 outputs power change commands to power level controller 30 which have been transmitted to the mobile station 200 from the base station 100. The data input signals to be transmitted from the mobile 200 to the base station 100 are received in a modulator 34. A transmitter 32 receives the modulated signal. The power level controller 30 varies the power of the transmitter 32 to transmit an output signal on an uplink channel at the designated output transmit power.

Figure 6:
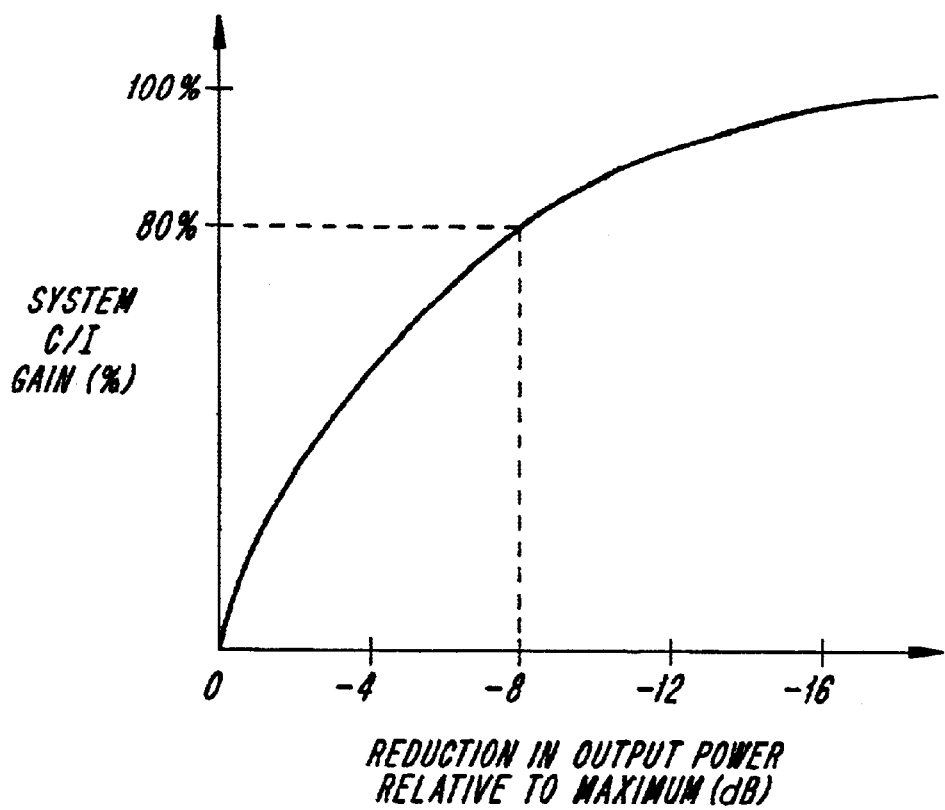
FIG. 6 is a graph which conceptually depicts a relationship between C/I gain and reduction in mobile station transmit power.

As mentioned above, Applicant has recognized that the benefits of uplink power control (i.e., reduction in interference or C/I gain) attributable to reducing a particular mobile station's transmit power begin to taper off after the mobile station's transmit power is reduced to a certain point. This relationship is illustrated in FIG. 6 (not to scale) which conceptually portrays the correspondence between C/I gain and the nominal mean burst transmit power. As illustrated in the graph approximately 80% of the C/I gain is achieved when a mobile station's transmit power has been reduced by about 8 dB from a maximum transmit power. Thereafter, additional reductions in mobile station transmit power result in more modest increases in C/I gain. Moreover, Applicant has further recognized that approximately 20% of the uplink power change commands which are transmitted by the system to mobile stations relate to power levels which are below this approximately −8 dB threshold, i.e., that about 20% of the power change commands have relatively less impact on interference to other users.

Given these realizations, exemplary embodiments of the present invention reduce the number of power change commands transmitted by the system. Power change commands which will have a relatively greater impact on C/I gain are transmitted whereas some power change commands which will have a relatively lesser impact on C/I gain need not be transmitted. By reducing the number of transmitted power change commands, the "blanking" effect created by using the FACCH to transmit power change commands from the system to the mobile stations is reduced, thereby improving the reproduced speech quality at mobile stations.

Figure 7:
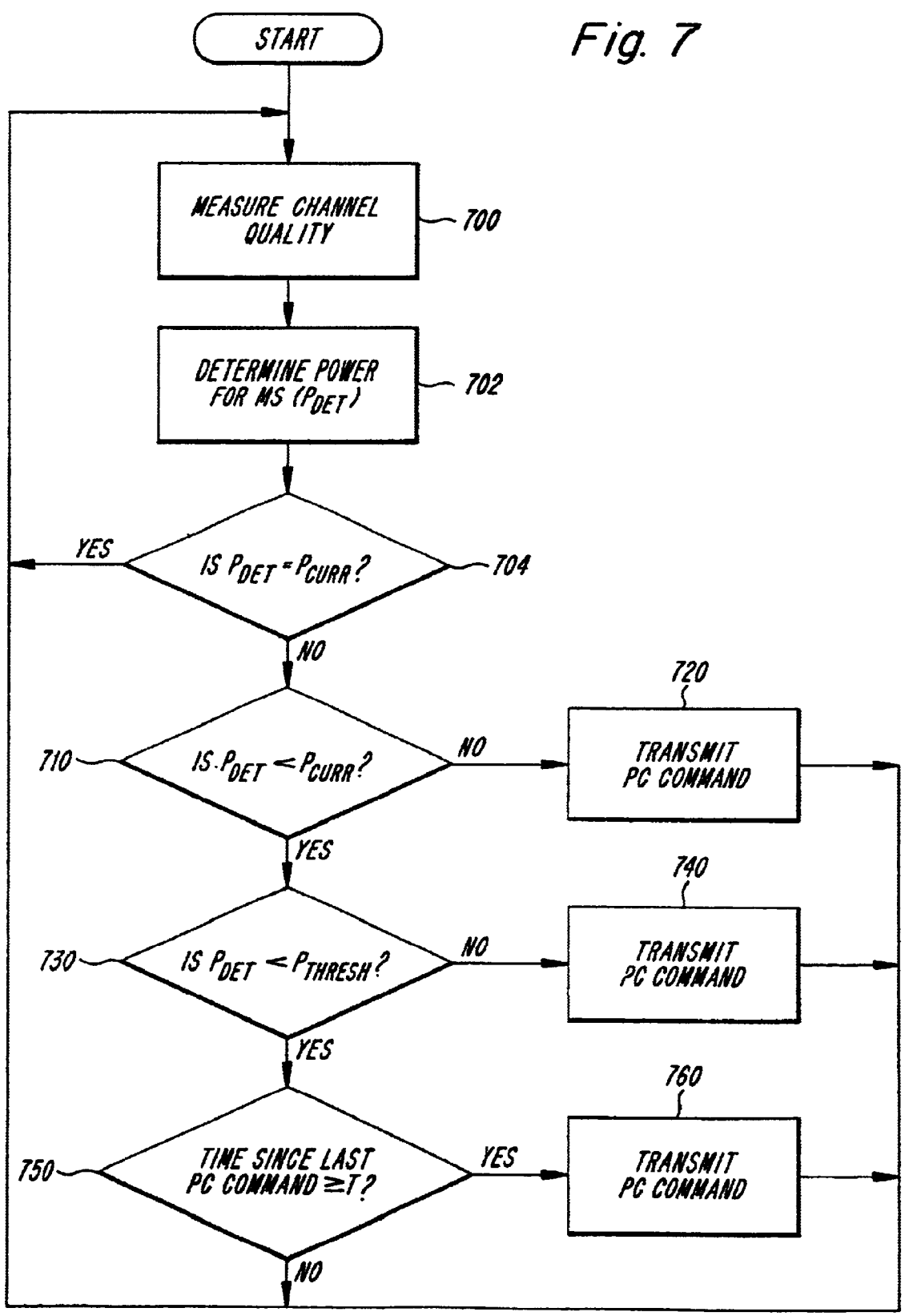
FIG. 7 is a flowchart depicting an exemplary method for transmitting power change commands according to an embodiment of the present invention.

The flowchart of FIG. 7 provides one example of the way in which systems and methods according to the present invention can be implemented. Therein, at step 700, the system measures or estimates the channel quality associated with a particular mobile station's uplink transmissions. This may occur periodically, e.g., once per second. Using this quality information, the system then determines an appropriate transmit power for that mobile station using a power control algorithm at step 702. If the determined power ($P_{DET}$) is substantially equal to the current transmit power ($P_{CURR}$) employed by this mobile station at step 704, then the process returns to the measurement step 700 since it is unnecessary to transmit a power change command.

If $P_{DET}$ is greater than $P_{CURR}$, as determined at step 710, then the system transmits a power change (PC) command at step 720 in order to maintain sufficient quality of the uplink connection. If, on the other hand, the power determined at step 702 is less than the current power employed by this particular mobile station to transmit on its uplink, then the flow will proceed from step 710 to step 730. Therein, the system determines whether the determined power level is less than a predetermined threshold ($P_{THRESH}$), e.g., 8 dB less than a maximum transmit output power or less than a predetermined absolute power level, e.g., power level 4 in FIG. 1. If not, then the flow moves to step 740, wherein the power change command is transmitted since this particular change may have a relatively significant impact on system C/I gain.

If, however, the determined power level is less than a current power level being employed by the mobile station under consideration and is less than the threshold, then it may be possible to omit transmitting a power change command. According to this exemplary embodiment of the present invention, the power change command will only be transmitted under these conditions if a predetermined time period T has elapsed since the last transmission of a power change command to that mobile station as illustrated by steps 750 and 760. For example, if the system determines that the transmit power level of a mobile station should be changed from power level 6 to power level 7 in FIG. 1, it will only transmit a power control change implementing this adjustment if a predetermined time period, e.g., five seconds, has elapsed since the last transmission of a power change command. The predetermined time period can be selected to be substantially longer than a processing time associated with determining an appropriate power level which may take, for example, one second. In this way, the use of the FACCH to send power change commands is reduced and speech quality at the mobile station is improved.

Figure 8:
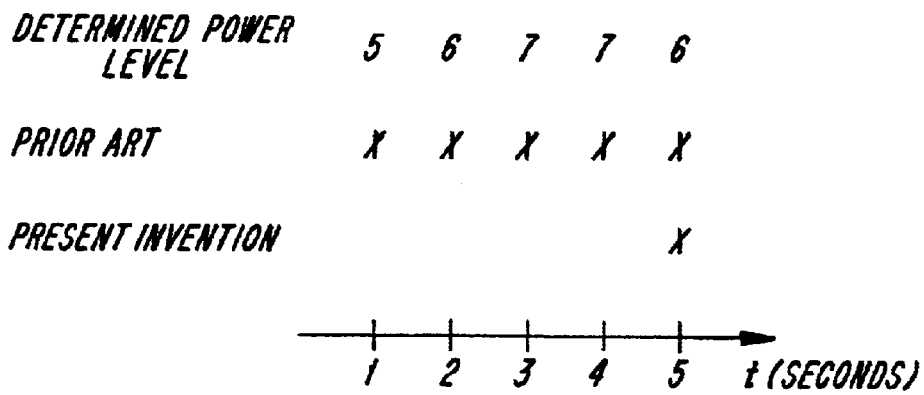
FIG. 8 illustrates a comparison of FACCH usage between conventional techniques and exemplary embodiments of the present invention.

Consider, for example, the illustrative comparison of FACCH usage according to conventional methods and methods and systems according to the present invention as illustrated in FIG. 8. Therein, the system has determined a sequence of five uplink power levels for controlling a mobile station's output transmit power based on, e.g., received signal strength and a power control algorithm. According to the conventional techniques described above, each of these five power change commands would have been transmitted by the system to the mobile station using the FACCH (thereby discarding certain payload data blocks), e.g., every second. However, according to the exemplary embodiment of the present invention described above, only the fifth power change command may be transmitted, thereby reducing FACCH usage.

Those skilled in the art will appreciate that the numerical examples, both in terms of frequency of transmission and threshold(s) for changing that frequency, are purely exemplary. More generally, the present invention contemplates all adjustments to the frequency of power change command transmissions that are based on the power levels themselves, i.e., the frequency of power change command transmission is a function of the power level to be conveyed in the command.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for transmitting a power change command to a remote station in a radiocommunication system, the method comprising the steps of:

determining, in said radiocommunication system, one of a plurality of power levels at which said remote station shall transmit;

comparing said one of said plurality of power levels to a threshold;

transmitting said power change command if said one of said plurality of power levels is greater than said threshold; and otherwise, is if said one of said plurality of power levels is less than or equal to said threshold, transmitting said power change command only if a predetermined time period has elapsed since transmission of a previous power change command.

2. The method of claim 1, wherein said step of determining further comprises the steps of:

measuring a received signal strength associated with a signal received by said system from said remote station; and identifying said one of said plurality of power levels using a power control algorithm and said received signal strength.

3. The method of claim 1, further comprising the steps of:

comparing said one of said plurality of power levels to a power level currently employed by said remote station; and transmitting said power change command if said one of said plurality of power levels is greater than said power level currently employed by said remote station.

4. The method of claim 1, wherein said predetermined time period is substantially longer than a total processing time associated with said determining and comparing steps.

5. The method of claim 4, wherein said predetermined time period is five seconds and said total processing time is approximately one second.

6. The method of claim 1, wherein said threshold is power level four.

7. The method of claim 1, wherein said threshold is approximately 8 dB less than a maximum transmit power associated with said remote station.

8. The method of claim 7, further comprising the step of:

transmitting said maximum transmit power from said radiocommunication system to said remote station.

9. The method of claim 1, wherein said threshold is selected to correspond to approximately 80% of a carrier-to-interference (C/I) gain which can be achieved by regulating a transmit power of said remote station.

10. The method of claim 1, wherein said steps of transmitting said power change command further comprise the step of:

transmitting said power change command on a fast associated control channel (FACCH).

11. A method for transmitting a power change command to a remote station in a radio communication system, the method comprising the steps of:

determining, in said radio communication system, one of a plurality of power levels at which said remote station shall transmit;

selectively transmitting, by said radio communication system, said power change command to said remote station based upon said determined one of said plurality of power levels; and withhold transmitting, said power change command to said remote station if said determined one of said plurality of power levels is less than a threshold and if a predetermined time period since transmission of previous power change command has not elapsed.

12. The method of claim 11, wherein said predetermined time period is substantially longer than a total processing time associated with said determining step.

13. The method of claim 12, wherein said predetermined time period is five seconds and said total processing time is approximately one second.

14. The method of claim 11, wherein said threshold is power level four.

15. The method of claim 11, wherein said threshold is approximately 8 dB less than a maximum transmit power associated with said remote station.

16. The method of claim 15, further comprising the step of:

transmitting said maximum transmit power from said radio communication system to said remote station.

17. The method of claim 11, wherein said threshold is selected to correspond to approximately 80% of a carrier-to-interference (C/I) gain which can be achieved by regulating a transmit power of said remote station.

18. The method of claim 11, wherein said step of selectively transmitting further comprises:

transmitting said power change command if said determined one of said plurality of power levels is greater than to a power level currently employed by said remote station.

19. A base station comprising:

a transmitter for transmitting a power change command; and a processor for determining a power level associated with said power change command and for determining whether said power change command shall be transmitted based on a time which has elapsed since a last power change command was transmitted, wherein said time is substantially longer than a total processing time associated for determining said power level and determining whether said power change command shall be transmitted.

20. The base station of claim 19, wherein said processor indicates that said power change command shall be transmitted if said time period has elapsed.

21. The base station of claim 19, wherein said time is five seconds and said total processing time is approximately one second.

22. The base station of claim 19, wherein said processor indicates that said power change command shall be transmitted if said power level is higher than a power level associated with said last power change command.

23. The base station of claim 19, wherein said processor indicates that said power change command shall be transmitted if said time period has elapsed and if said power level is lower than a threshold power level.

24. The base station of claim 23, wherein said threshold power level is power level four.

25. The base station of claim 23, wherein said threshold power level is approximately 8 dB less than a maximum transmit power.

26. The base station of claim 23, wherein said threshold power level is selected to correspond to approximately 80% of a carrier-to-interference (C/I) gain which can be achieved by regulating a transmit power of a remote station.

27. A base station comprising:

a transmitter for transmitting a power change command; and a processor for determining a power level associated with said power change command and for determining, when the determined power level is less than a threshold power level, whether said power change command shall be transmitted based on a time which has elapsed since a last power change command was transmitted.

* * * * *